Feb. 20, 1940.  H. J. DE N. McCOLLUM  2,191,173
AUTOMOBILE HEATER
Filed Jan. 28, 1936  4 Sheets-Sheet 1
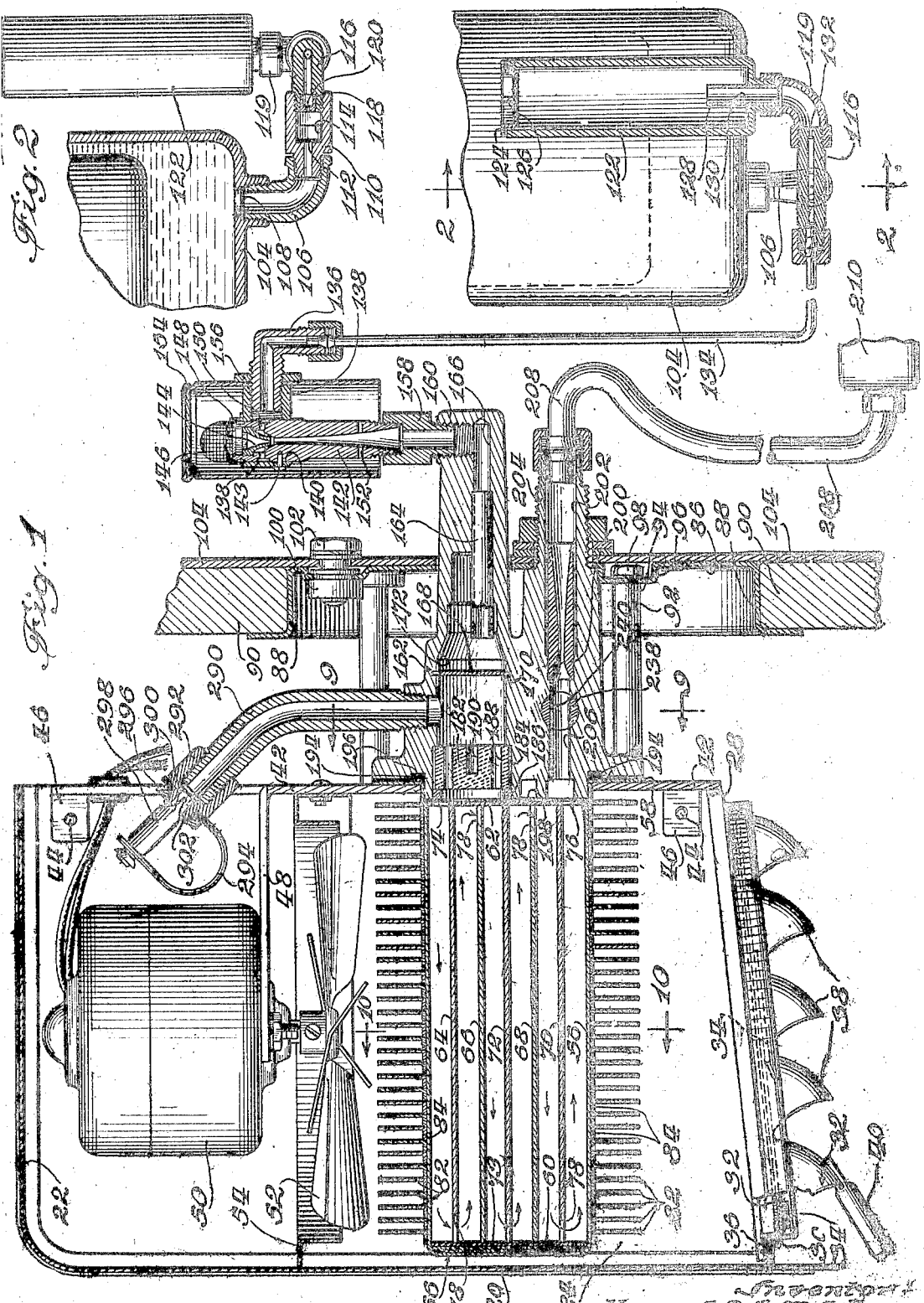

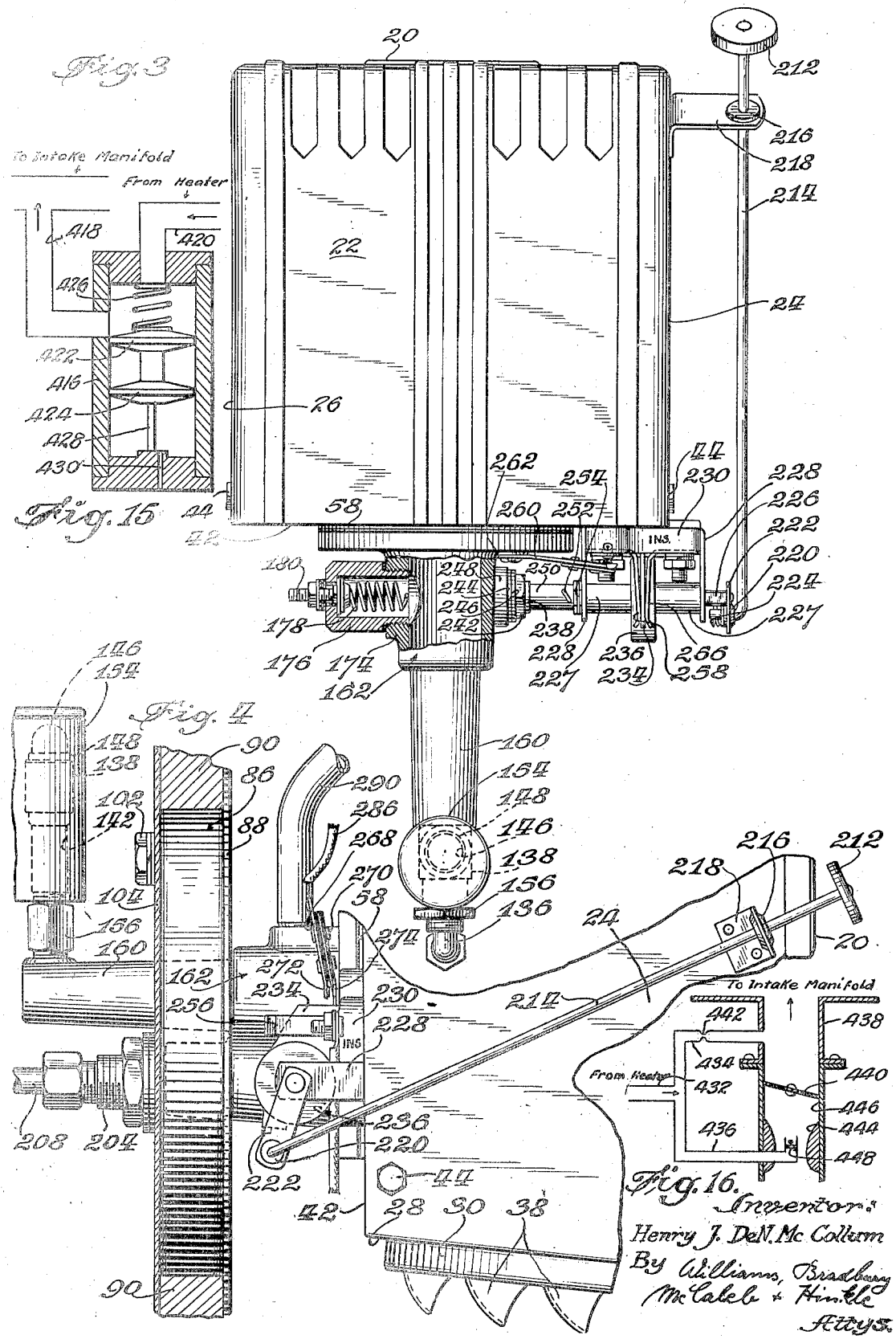

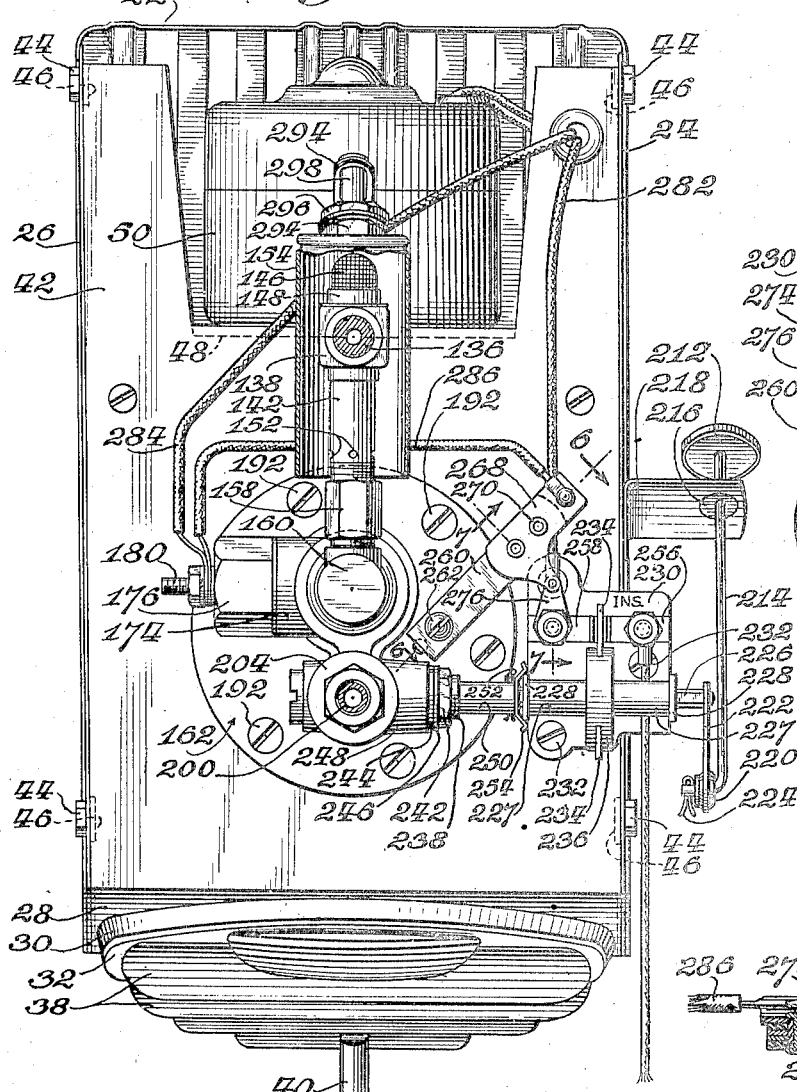

Feb. 20, 1940. H. J. DE N. McCOLLUM 2,191,173
AUTOMOBILE HEATER
Filed Jan. 28, 1936. 4 Sheets-Sheet 4
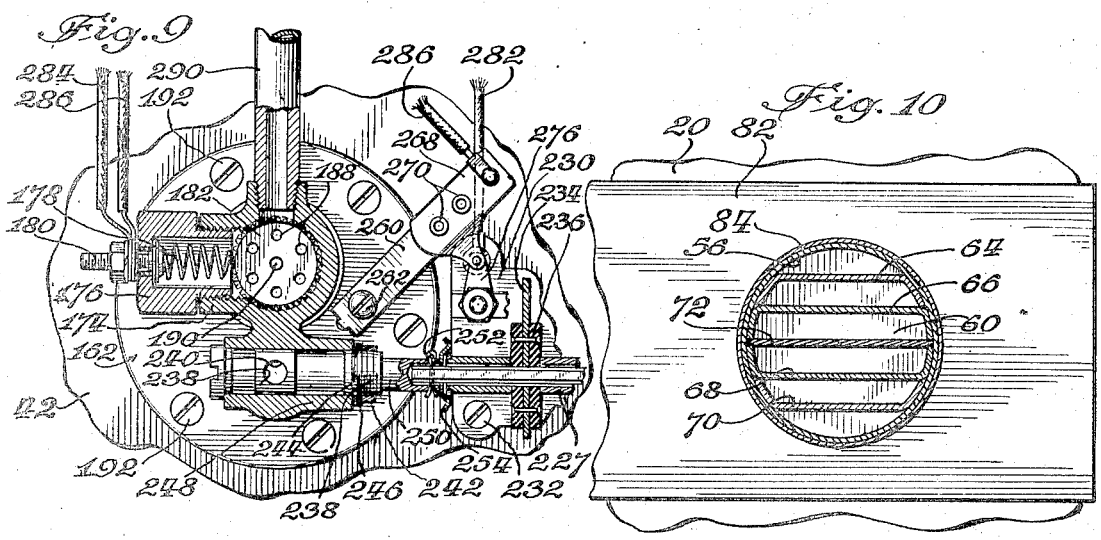
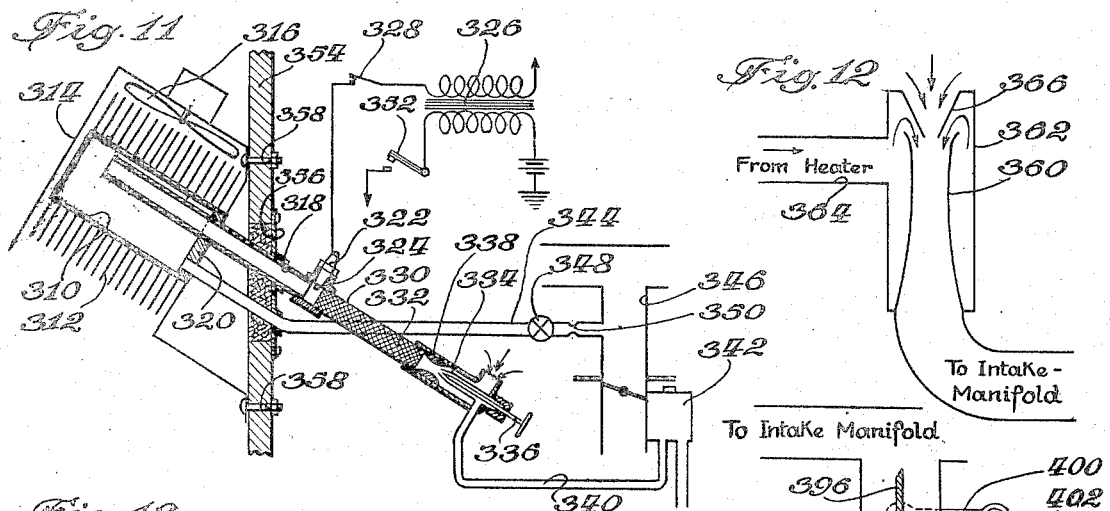
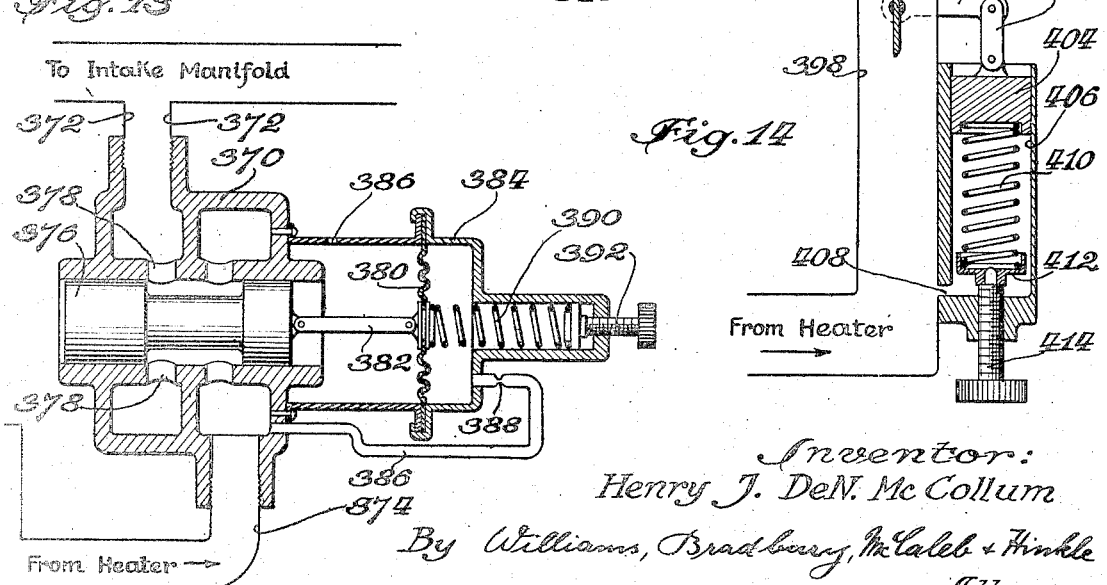
Inventor:
Henry J. DeN. McCollum
By Williams, Bradbury, McCaleb & Hinkle
Attys.

Patented Feb. 20, 1940

2,191,173

UNITED STATES PATENT OFFICE 2,191,173

AUTOMOBILE HEATER

Henry J. De N. McCollum, Evanston, Ill.

Application January 28, 1936, Serial No. 61,213

16 Claims. (Cl. 237—12.3)

My invention relates generally to automobile heaters, and more particularly to heaters of this type which include an independent heat generator, although a number of features thereof may be utilized in other types of heaters. The various forms of automobile heaters now in use have several inherent disadvantages which are overcome by my present invention. Most, if not all, heaters which derive their heat from the engine of the vehicle—either from the water circulating system or from the exhaust—whether by convection air currents or through steam generation, take a considerable time before they become effective to deliver an appreciable quantity of heat to the passenger compartment of the automobile.

Furthermore, all heaters of these types are limited in the amount of heat which they can deliver by the amount of waste heat generated by the engine, and thus are usually of little value while the engine is idling.

When installing hot water heaters on automobiles equipped with V type engines, it is usually not feasible to connect the heater to both water circulating systems, so that only one-half of the available heating capacity is usable.

In the heater of my invention a heat generator separate from the engine is utilized, and the capacity of the heater is thus independent of the amount of waste heat which may be available. Furthermore, the heater will commence giving off heat a very short time after it is turned on, long before the engine is sufficiently heated to make possible the use of a hot water heater.

The effectiveness of hot water automobile heaters is further limited by the fact that the temperature of the water circulated through the heater must necessarily be relatively low, especially if anti-freeze solutions which evaporate at a lower temperature than water are employed in the cooling system. In the heater of my invention the temperature of the radiator may be maintained considerably above that of the boiling point of water, and as a consequence the rate of heat exchange between the radiator and the air circulated past it is much higher than would be possible with any conceivable type of hot water heater. The heat radiator may therefore be made much smaller and more compact.

A further advantage of the heater of my invention is that it need not necessarily be placed near the engine, but may, for example in buses, be located a considerable distance from the engine, where it will have maximum effectiveness in distributing the heat properly to the passenger compartment. In certain installations it may be desirable to have two or more heating units installed upon a single vehicle to procure more uniform distribution of heat in the passenger compartment of a vehicle, and such multiple installations can very readily be made with the heater of my invention.

It is thus an object of my invention to provide an improved heater, particularly for automobiles and the like, which is independent of the engine heat for its operation, which may be easily started, will continue in effective operation without the attention of the operator of the vehicle, and which is relatively simple in construction and may be economically manufactured.

A further object is to provide a liquid fuel burning heater with improved means for igniting the mixture of the fuel and air.

Another object is to provide improved means for causing a substantially uniform rate of flow of the gases of combustion through the heater.

Another object is to provide a heater for automotive vehicles in which liquid fuel is consumed and in which the suction of the intake manifold is utilized to draw the fuel mixture and gases of combustion through the heater.

A further object is to provide an improved automobile heater which is dependable, safe, economical, and effective in use.

Another object is to provide an improved method and means for mounting a heater in automotive vehicles.

Other objects will appear from the following description, reference being had to the accompanying drawings, in which:

Figure 1 is a central vertical sectional view of the heater, showing also the fuel supply;

Figure 2 is a vertical sectional view taken on the line 2—2 of Fig. 1;

Figure 3 is a plan view of the heater, a portion of the combustion chamber being shown in fragmentary section to show the igniter;

Figure 4 is a fragmentary side elevation of the heater;

Figure 5 is a rear elevation of the heater, portions of the carburetor being shown in section;

Figures 6 and 7 are sectional views taken on the lines 6—6 and 7—7, respectively, of Fig. 5, showing particularly the thermostatic switch;

Figure 8 is an electrical wiring diagram of the heater;

Figure 9 is a vertical sectional view taken on the line 9—9 of Fig. 1;

Figure 10 is a fragmentary vertical sectional view taken on the line 10—10 of Fig. 1;

Figure 11 is a diagrammatic view of a modified form of my invention; and

Figures 12, 13, 14, 15, and 16 illustrate modified forms of devices for compensating for variations in the vacuum in the intake manifold.

*Brief general description*

The automobile heater of my invention comprises generally a simple carburetor which is preferably supplied with gasoline from the float bowl of the usual engine carburetor, there being suitable means to control the flow of gasoline to the heater carburetor and to supply a priming charge of gasoline thereto upon starting. The combustible mixture from the carburetor is fed to a combustion chamber through a suitable preheating device which will cause turbulence of the mixture in the combustion chamber. In a recess in the side of the combustion chamber is located an electrical heating element for igniting the combustible mixture. The outlet end of the combustion chamber is formed by a refractory ceramic plug having a plurality of passageways extending therethrough and having also a small recess for the collection of gases. During normal operation this plug is maintained at sufficiently high temperatures, and it is made of such material and is of such conformation, that it will serve as a re-igniter should the flame in the combustion chamber be extinguished.

The gases of combustion, after passing through the re-igniter plug, are drawn through a radiator comprising a circuitous heat-conducting passageway to which heat radiating fins are thermally connected. An electric motor driven fan circulates air from the passenger compartment of the vehicle over these heat radiating fins. After passing through this heat exchange radiator the gases of combustion are drawn through a restricted passageway of Venturi tube shape. A suitable conduit connects the outlet end of the Venturi-shaped passageway to the intake manifold of the engine.

The operation of the heater is controlled by a valve in the passageway adjacent the venturi as well as by a switch which controls the supply of current from the battery of the vehicle to the electrically heated igniter and to the fan motor. The combustion chamber has associated therewith a thermostatic switch which is operable to break the circuit to the electrically heated igniter when the combustion chamber attains the temperature of its normal operation. The electric fan motor is in a shunt circuit bridging the thermostatically operated switch so that when the switch is opened the fan will commence blowing air over the radiator. Suitable means are provided to prevent excessive heating of the device and to cause extinguishment of flame should the motor driven fan for any reason cease operation.

*The radiator*

The radiator comprises a suitably ornamented casing having an integral front 20 and top 22 to which side walls 24 and 26 are secured, preferably by spot welding. The bottom wall 28 has flanges which are welded to the side walls 24 and 26 and has a Z-shaped flange 30 surrounding a large circular opening formed therein. A circular deflector plate 32 rests upon a plurality of resilient projections 34 struck upwardly from the generally horizontal portion of the flange 30, the plate being held in contact with the resilient projections 34 by a retainer ring 36 which is Z-shaped in cross section and is secured within the cylindrical portion of the flange 30 by a press fit. The deflector plate 32 is provided with a plurality of louvres 38 pressed outwardly therefrom, one of the louvres having a handle 40 suitably secured thereto as by welding.

The back plate 42 of the casing is of relatively heavy sheet material and forms a frame for the radiator. This plate 42 fits very closely against the side walls 24, 26 so as to prevent the escape of heated air which might otherwise be directed against the fire wall which separates the engine compartment from the passenger compartment of the automotive vehicle, and upon which the heater is mounted. The side walls 24 and 26 are secured to the back plate 42 by a plurality of cap screws 44 which are threaded in ears 46 bent inwardly from the back plate 42. A pair of arms 48 are bent inwardly from the back plate 42 and form a support for an electric motor 50 which drives a fan 52. A flanged baffle ring 54 is secured to the back plate 42 and surrounds the periphery of the fan 52 to increase the efficiency thereof.

The heat exchanger comprises a closed end tube 56 having a flange 58 formed integrally therewith. Within the cup 56 is a unit forming a long circuitous passageway for the heated gases of combustion, this unit comprising a pair of discs 60, 62, to which are secured channel-shaped plates 64, 66, 68 and 70, and a flat plate 72, each of the plates having riveting lugs projecting through complementary holes formed in the discs 60 and 62. A cushion plate 73 is located between the plate 60 and the end of tubes 56. The plate 62 is provided with an inlet aperture 74 and an outlet aperture 76, and the plates 64, 66, 72, 68 and 70 are provided with suitable openings 78 at successively opposite ends to provide a long circuitous passageway as indicated by the arrows in Fig. 1.

A plurality of heat radiating fins 82 which are rectangular in shape and extend substantially the full distance between the side walls 24 and 26 of the casing, have central apertures surrounded by flanges 84 and are secured upon the cup 56 by being pressed thereupon. The flanges of the end fins 82 may be prick punched, more firmly to secure them to the cup 56. It will be noted that the flanges 84 serve as a convenient means for accurately spacing the fins. The fins may be made of thin sheet copper or any other suitable material having good thermal conducting and radiating properties.

*The radiator mounting*

It is important that the casing of the heater which contains the radiator be firmly supported and that the mounting shall be effective harmlessly to distribute any heat which may be conducted from the radiator. I have therefore provided a relatively large mounting plate 86 which has a peripheral L-shaped flange 88 engageable in a complemental aperture formed in the sound and heat insulating portion 90 of the fire wall which separates the engine compartment from the passenger compartment of the vehicle. The mounting plate 86 is secured to the radiator by four studs 92 which are threaded in the back plate 42 and have threaded ends 94 of reduced diameter fitting in holes formed in bosses 96 pressed from the mounting plate 86.

The bosses 96 form recesses for the reception of nuts 98 threaded on the reduced diameter portions 94 of the studs 92. The mounting plate 86 has a plurality of nuts 100 which are crimped upon suitable bosses, the nuts 100 receiving cap screws 102 which extend through the metallic fire wall 104 of the vehicle, suitable lock washers being provided on these bolts.

Fuel supply

For convenience and dependability, I preferably use gasoline as the fuel to be burned in the heater of my invention. The float bowl of the engine carburetor forms a convenient source of supply for the gasoline. In Figs. 1 and 2 the float bowl 104 of the engine carburetor is shown as tapped to receive a street L 106, a screen 108 being provided to prevent solid matter from being drained from the float bowl with the gasoline. A fitting 110 is threaded in the street L, this fitting having a fine mesh screen 112 secured therein by a retaining ring 114. A T fitting 116 is threaded in the outlet end of the fitting 110 and has a flow restriction plug 118 pressed therein. This plug is provided with a very small opening 120, preferably in the order of .010" in diameter.

A priming well 122 is secured to one branch of the T fitting 116 by an elbow 119, the top of the well 122 being covered by a closure 124. This closure has a plurality of ribs 126 pressed outwardly therefrom so that when the closure is pressed into the end of the well 122 there will be a clearance of approximately .010" between all parts of the closure and the walls and end of the well, except of course at the points at which the ribs 126 contact with the well, and the interior of the well will thus be vented to the atmosphere. Extending upwardly from the bottom of the well is a tube 128 which has a hole 130 drilled through the side thereof above the bottom of the well, this hole being in the order of .015" in diameter. The portion of the T fitting 116 to which the elbow 119 is connected has a restricted opening 132 formed therein communicating with the passage through the T, this opening being preferably considerably larger than the hole 130 in the tube 128, preferably in the order of .035" in diameter. The fuel is supplied to the heater carburetor through a tube 134 which is suitably secured to the other branch of the T fitting 116.

The heater carburetor

The heater carburetor is preferably located at a level a few inches above the float chamber of the engine carburetor and has a fuel receiving elbow fitting 136 which is connected to the fuel supply tube 134. The elbow 136 is threaded into a fitting 138 having a vertically drilled diametral hole 140 to receive a Venturi tube 142. The Venturi tube is pressed into the fitting 138 and held in place by a pin 143. The inlet of the Venturi tube is formed by a suitably shaped Venturi mouth 144 which is pressed into position in a bore formed at the upper end of the tube 142. A fine mesh screen 146 is secured to the upper end of the Venturi tube by means of a flanged ferrule 148. Suitable orifices 150 are provided to conduct gasoline from the elbow 136 to a point adjacent the throat of the Venturi tube 142. A plurality of holes 152 are drilled at the lower end of the Venturi tube to admit additional air, to form a mixture of correct proportions. A shield 154 is secured around the Venturi 142 by a nut 156 to protect the carburetor parts and to make necessary that the air entering the carburetor through the screen 146 follow an upward path. The lower end of the Venturi tube 142 is threaded in a bushing 158 which is in turn threaded into an extension 160 forming part of the body 162.

The combustion chamber and igniter

The combustible mixture of gasoline and air which is supplied by the carburetor is fed through a tube 164 which is pressed into a passageway 166 formed in the extension 160. A baffle plate 168 of suitable heat resisting material is located in the combustion chamber 172 adjacent the open end of the tube 164. The baffle plate is supported on three radially extending ears engaging the walls of the chamber 172, and has a diameter about 1/8" less than the combustion chamber. The tube 164 projects into the combustion chamber 172 formed in the body 162. The mixture gasoline and air is distributed fairly evenly throughout the chamber because of the turbulence engendered by impact with the baffle plate. During operation, this tube and baffle plate become hot and pre-heat the fuel and gas mixture.

At the side of the combustion chamber (Figs. 5 and 9) is a boss 174 into which an igniter body 176 is threaded. This igniter body has a longitudinally extending bore in which a resistance element 178, which constitutes the igniter, is mounted. The inner end of the resistance element, which may be made of nichrome wire, is preferably welded or otherwise secured to the inner end of the igniter body while the outer end of the resistance wire is suitably insulated from the body 176 and is electrically connected to a binding post 180 which is likewise insulated from the body of the igniter by heat resistant insulating bushings and washers. It is important that the igniter be located in a pocket of the combustion chamber where it is not exposed directly to cooling by the incoming mixture of air and gasoline.

A re-igniter plug 182 is held in a suitable socket 184 formed in the end of the combustion chamber 172 by a retaining ring 186. The cylindrical surface of this re-igniter plug is preferably striated so as to reduce the area of contact between the plug and the body 162, thus lessening the rate of transmission of heat from the plug to the body.

The re-igniter plug is preferably made of a refractory ceramic material which is slightly porous. The plug is provided with a plurality of longitudinally extending passageways 188 which are of relatively small diameter and is also provided with a recess 190 at its center and opening into the combustion chamber.

The re-igniter plug 182 will, during the operation of the heater, normally remain at a sufficiently high temperature to re-ignite the combustible mixture, should the flame be accidentally extinguished. Furthermore, this re-igniter plug aids in obtaining complete combustion by providing a hot spot in the combustion chamber. It is believed that the re-igniting plug is effective in re-igniting the mixture after the flame has been extinguished because of the fact that the combustible mixture tends to collect in the recess 190 and stays in this recess a sufficiently long time to become heated to a temperature necessary to cause its ignition.

Considerable difficulty was had in the provision of the re-igniter plug since this element must satisfy a great many requirements. It must be composed of material which will not deteriorate when maintained at high temperatures for long periods of time, and it must be sufficiently homogeneous and strong that it will not flake or crack when exposed to rather sudden temperature changes of considerable magnitude. Furthermore, the material should be slightly porous, since it appears that re-ignition of the combustible mixture commences in the minute depressions and crevices formed in the surface of the plug, it having been found that a plug having a glazed or smooth vitreous surface is not nearly as effective to re-ignite the combustible mixture as a plug of a material which has a slightly porous surface. Furthermore, the re-igniter plug should not be a very good conductor of heat, since the plug must be effective to hold heat for an appreciable length of time to permit re-ignition to take place. For example, it has been found that a re-igniter plug made of metal conducts heat to the body of the combustion chamber much too rapidly to serve very efficiently as a re-igniter.

The recess 190 in the center of the plug must be small enough and deep enough to prevent excessive turbulence of the gas, yet it must be large enough to permit the entrance of the combustible mixture of air and gasoline. I have found that a recess in the order of 1/8" in diameter and 3/4" deep is satisfactory, although it will be understood that there may be appreciable variation in the size, shape and location of this recess without rendering the re-igniter ineffective. However, with a plug of the above described properties and a recess of the given dimensions it has been found that the re-igniter will be effective after the flame has been out for a period of at least fifteen seconds.

The body 162 is secured to the back plate 42 by a plurality of cap screws 192. A suitable gasket 194 (preferably made of copper and asbestos) is interposed between the body and the flange 58 of the radiator cup 56. The body 162 is preferably provided with a recess 196 to receive the gasket 194. A seal is effected between the disc 62 and the body 162 by a thin gasket 198 which is interposed between these parts and which has suitable apertures in registry with the openings 74 and 76 formed in the disc 62.

*The compensator for variations in intake manifold vacuum*

As is well known, the degree of vacuum in the intake manifold of an internal combustion engine used upon an automobile may vary considerably during normal operation, ranging from zero to approximately 26 inches of mercury. As previously stated, the vacuum present in the intake manifold of the engine is utilized to draw the air and gasoline into and through the heater carburetor to the combustion chamber and to draw the products of combustion through the radiator. If the degree of vacuum in the combustion chamber were permitted to vary as greatly as does the vacuum in the intake manifold of the engine, the operation of the heater would be very irregular and unsatisfactory. The probability is that the flame in the combustion chamber would be extinguished frequently due to these variations in the vacuum.

I have, therefore, provided a suitable means for compensating in a great measure for the variations in intake manifold vacuum. This means comprises a restriction nozzle or tube 200 which is secured in the reduced end of a recompression chamber 202 formed in an extension 204 of the body casting 162. The nozzle 200 has a Venturi-shaped passageway extending therethrough and at its inlet end is normally in communication with a passageway 206, the latter being in registry with the outlet opening 76 in the disc 62 of the radiator. A tube 208 is secured to the end of the extension 204 by a suitable compression coupling and has its other end similarly secured to the intake manifold 210 of the engine.

Since the pressure in the passageway 206 can never be greater than atmospheric pressure, and the dimensions of the passageway through the restriction nozzle 200 are such that with approximately a four inch vacuum in the intake manifold, the vacuum at the throat of the Venturi passageway in the nozzle 200 will be of a maximum value, i. e., the pressure at the throat approaches zero absolute. Thus, any increase in the vacuum in the intake manifold (decrease in absolute pressure) cannot result in an appreciably decreased pressure at the throat of the tube, and as a result the rate of flow through the tube 200 will be substantially constant whenever the vacuum in the intake manifold is equivalent to or exceeds approximately four inches of mercury.

Even if the vacuum in the intake manifold drops below the four inches of mercury (which was assumed to be approximately the vacuum necessary to cause the maximum vacuum at the throat of the tube 200), the decrease in the rate of flow through the tubes 200 will not be very great. Since large decreases in the intake manifold vacuum take place only occasionally upon sudden acceleration of the vehicle, and are usually of short duration, such decreases usually do not result in the extinguishment of the flame, or, if the flame in the combustion chamber is extinguished, it is promptly re-ignited by the re-igniter plug as soon as the vacuum is again normal.

Another advantage of the compensator is that a greater weight of gas will flow through it when the gas is cold than when the gas is heated. Thus, in starting the heater, a greater weight of gas will be drawn through the heater than when the heater has been in operation for some time, thereby aiding in bringing the heater more rapidly to its fully effective operating temperature.

*Control means*

The heater is controlled by a handle 212 having a stem 214 guided in a rubber grommet 216 mounted in an angle clip 218 which is preferably welded to the sidewall 24 of the radiator housing. The lower end of the stem 214 has a sidewardly bent extremity passing through a grommet 220 carried by a lever 222, the end of the stem being held in the grommet by a cotter pin 224. The lever 222 is secured to the end of a square shaft 226 which is mounted for rotation in bearings 227 which are supported by a U-shaped bracket 228, the bracket being held in place by an insulating switch plate 230 which is secured to the back plate 42 by screws 232. A knife switch blade 234 is embedded in a disc 236 made of hard rubber or other suitable insulating material, the switch blade being thus insulated from the shaft 226 which extends through a square hole formed in the insulating disc 236. The disc 236 is centered between the two upstanding portions of the bracket 228 by the bearing member 227.

A rotating plug valve 238 has a passageway 240

(Fig. 1) adapted to register with the passageway 206 and is secured in position by a nut 242 threaded on the stem of the plug 238, a flat washer 244, and a lock washer 246 being interposed between the nut 242 and the end face of a boss 248 (which is formed integrally with the body 162) to maintain the valve tight. An extending stem 250 of the valve 238 has a socket to receive the end of the square shaft 226, and the shaft and stem are nonrotatably secured together by a cotter pin 252. A spring washer 254 is interposed between the end of the stem 250 and the bracket portion 228, so that the former will be frictionally held in any position to which it may be moved.

The blade 234 of the knife switch is cooperable with a pair of resilient contact strips 256 and 258, which are bolted to the insulating switch plate 230.

A bimetallic thermostatic element 260 has one end secured to the body 162 by a screw 262, the end of the thermostatic element having a depending tongue 264 engaged in a recess 266 formed in the body casting 162 properly to position the element. A contact bracket 268 is secured to the thermostatic element 260, as indicated in Figs. 6 and 7, by a pair of hollow rivets 270, suitable insulating material being interposed between the bracket and the thermostatic element. A contact point 272 is carried by the bracket 268 for cooperation with a complemental contact point 274 carried by a lug 276, which is secured in conductive relationship with the switch contact 258 by means of the bolt by which the contact 268 is secured to the insulating switch block 230. The thermostatic element 260 when at or near atmospheric temperature will maintain the contact points 272, 274 closed, but when the temperature of the body casting 162 attains a value which is near the normal when the heater is operating satisfactorily, the thermostatic element 260 will separate the contact points 272, 274.

The wiring diagram shown in Fig. 8 clearly indicates the electrical connections to the heater. Current is supplied by the usual storage battery 278, one side of which is grounded. If desired, the current for the heater may be connected in series with the ignition switch 280 of the automobile, although the knife switch contact 256 may, if desired, be connected directly to the battery. Current to the heater is controlled by the knife switch 234, 256, 258, which, upon being closed, supplies the motor 50 with current through conductors 282 and 284. It will be noted that the circuit to the motor is shunted by a circuit including the lug 276, contact points 272, 274 and conductor 286, and that these two parallel circuits are connected in series with the resistance heating element 178 which forms the igniter. This particular circuit arrangement is not my invention, but is fully disclosed and claimed in the copending application of Arden W. Le Fevre, Serial No. 61,934, filed February 1, 1936, which has matured into Patent No. 2,133,103, dated Oct. 11, 1938.

From the wiring diagram of Fig. 8, it will be apparent that when the heater is cold and the contacts 72, 74 are closed, these contacts will short circuit the windings of the motor so that substantially all of the current from the battery will flow through these thermostat contacts. The fan motor will, therefore, not operate upon initial closure of the knife switch, and thus the uncomfortableness of having the fan motor cause a blast of cold air to be directed at the occupants of the vehicle, is obviated. When, however, the heater has operated a sufficient length of time that its body 162 is at a sufficiently high temperature to cause deflection of the thermostatic element 260, the contact points 272, 274 will be separated and the motor M will then be supplied with current. As a result, the fan motor commences operation only after the radiator is sufficiently warm to heat the air circulated by the fan. It will be noted that the current used to operate the motor must flow through the igniter 178, but since the resistance of the igniter is very low compared with the resistance of the windings of the motor, the igniter will not be heated appreciably by the current passing through it, and will not add to the load upon the battery.

Safety valve

In order to prevent the possibility of overheating, I have provided a safety valve which is thermostatically controlled and is operable to admit a large volume of atmospheric air to the combustion chamber to cool the latter and to extinguish the flame therein. Such overheating might result should the electric motor driven fan cease operation for any reason.

The safety valve is mounted at the end of a bent pipe 290, which is in communication with the combustion chamber 172, being threaded in the body casting 162. A bushing 292 is threaded to the outer end of the pipe 290 and has a U-shaped bimetal thermostatic element 294 secured thereto by a nut 296. A valve 298 is carried by the free end of the bimetal strip 294, and has a generally conically shaped portion 300 which is adapted to contact with a seat 302 formed at the end of the bushing 292.

At normal temperatures the bimetal element 294 is biased so as resiliently to hold the valve 298 firmly against the seat 302. The bimetal element is located within the radiator casing above the fan and radiator. With the fan operating normally, the bimetal element 294 will be in the path of cool air drawn into the casing by the fan. If, however, the fan motor should burn out or for any other reason the fan should be ineffective to circulate air past the radiator, the heated air from the radiator would promptly rise and flow past the bimetal element 294, thus causing deflection of the latter in a direction to relieve the tension holding the valve 298 to its seat and withdrawing the valve from its seat.

When the valve 298 is open, atmospheric air is drawn directly into the combustion chamber, and since this is a low resistance path of flow for the air, the vacuum on the carburetor will be insufficient to permit effective operation thereof. Thus, if the valve is raised an appreciable distance from its seat, the flame in the combustion chamber will be extinguished due to the large supply of incoming cold air and to the decrease in the supply of fuel mixture from the carburetor.

This subject matter is claimed in my copending application Serial No. 120,524 filed January 14, 1937, said application being a continuation in part of the instant application.

Operation

The operations performed by the various elements of the heater have been described in some detail in connection with the detailed description of the parts. I shall therefore merely describe in general the operation of the heater as a whole, and point out the various advantages of the constructions and methods of operation employed.

When it is desired to use the heater, the operator will push the handle 212 inwardly and downwardly, thereby rotating the square shaft 226 to open the valve 238 in the outlet passageway 206 and close the knife switch 234, 256, 258. As soon as the valve 238 is opened, the suction of the intake manifold will reduce the pressure in the combustion chamber and in the passageways of the carburetor 142, whereupon a partial vacuum will also be induced in the conduit tube 134 which, through the restricted passageway 132, is in communication with the well 122. This partial vacuum will thus draw gasoline from the well 122 through the tube 128, restricted orifice 132, T fitting 116, and tube 134 to supply the carburetor with a priming charge of gasoline which will result in a very rich mixture being drawn into the combustion chamber 172. During this interval, the igniter 178 will have become heated to incandescence and will ignite the rich priming mixture being fed to the combustion chamber.

After the level of the fuel in the well 122 reaches the top of the tube 128, the amount of fuel fed to the carburetor will be greatly decreased but a charge of fuel still slightly in excess of the normal will be supplied through the port 130 drilled in the side of the tube 128. Thus, during the time that the combustion chamber is being heated to its normal operating temperature, a mixture of fuel and air slightly richer than normal will be continued to be supplied.

At about the time that combustion becomes normal, the fuel in the priming well 122 will have become exhausted and air will be drawn in through the tube 128 and gasoline will flow directly from the float bowl of the engine carburetor past the screens 108 and 112 through the orifice 120 in the plug 118, and thence through the tube 134 to the carburetor. The air drawn through the tube 134 with the gasoline thus drawn from the float bowl of the carburetor will decrease the specific gravity of the mixture so that it may be easily elevated to the carburetor.

As soon as the body casting 162 becomes sufficiently heated as a result of normal combustion, the thermostat controlled contacts 272, 274 will be separated and the fan motor thus supplied with current, causing the circulation of air between the fins 82 and around the radiator shell or cup 56 into the passenger compartment of the vehicle.

Upon pulling upon the handle 212, the main switch 234, 256, 258 will be opened and the valve 238 closed, whereupon the heater will immediately cease operating.

The modification of Figure 11

The modified construction shown in Fig. 11 differs in some respects from that diagrammatically shown in Figs. 1 to 10 inclusive. In this embodiment of my invention the radiator comprises a cup 310 which has the usual heat radiating fins 312 secured thereto, the radiator being enclosed in a suitable casing 314 and provided with the usual motor driven fan 316.

The combustion chamber is formed by a pipe 318 which is threaded in a closure 320 secured in the end of the cylindrical cup 310. The pipe 318 extends almost to the end of the cup 310 to more evenly distribute the heat therein. Ignition of the charge is accomplished by means of a spark plug 322 carried in a suitable T-shaped fitting 324. The spark is supplied from a spark coil 326 which may be of any suitable construction and is preferably in a circuit completed by closure of a switch 328, the switch being manually controlled, as in the previously described construction. The fuel is supplied to the combustion chamber 318 through a tube 330 which is filled with lightly compacted steel wool 332, or similar heat conducting material.

The carburetor may be of a simple form having a jet nozzle 334 controlled by a needle valve 336 and a Venturi tube 338 to increase the amount of suction at the jet. Fuel is supplied to the jet 334 through a tube 340 connected to a fuel supply reservoir 342, which may, as in the previously described construction, be the float bowl of the carburetor, an independent fuel reservoir, or a connection to the outlet side of a fuel pump.

The products of combustion may be drawn from the chamber within the cup 310 by a tube 344 connected to the intake manifold 346 of the automobile engine. A manually controlled valve 348 is provided, this valve being preferably operated in conjunction with the switch 328. A restriction 350 is provided in the tube 344, in a measure to control the degree of suction transmitted to the heater.

In most of its essential features the heater shown in Fig. 11 is similar to that shown in Figs. 1 to 10, and it will operate in a generally similar manner. The combustible mixture from the carburetor 334, 338 will be pre-heated by the steel wool 332 and ignited by the spark plug 322. Because of the relatively low energy consumption of the spark plug, it may be supplied with high tension current intermittently throughout the period that the heater is operating, or, if desired, a thermostatic switch 352, which is mounted upon or near the combustion chamber 318, may be provided in the primary circuit of the spark coil, so as to cut off the supply of current to the spark coil whenever the combustion chamber is at the temperature normally maintained during proper operation of the heater.

The heater may be secured to the dashboard 354 of the vehicle in which it is mounted, by means of a flanged plate 356 through which the combustion chamber pipe 318 and tube 344 extend, the pipe and tube being either threaded in the flanges of the plate 356 or being otherwise suitably secured thereto as by welding. The casing of the heater may be supported either solely by the pipe 318 and tube 344 or may in addition be secured to the dashboard 354 by bolts 358.

Compensators for variations in intake manifold vacuum

While I have found that the compensator for variations in intake manifold vacuum, which is utilized in the heater illustrated in Figs. 1 to 10 inclusive, is very satisfactory to accomplish the desired result, various other means for accomplishing this purpose may be used with greater or less advantage. In Fig. 12 I have shown a modified form of intake manifold vacuum variation compensator. It comprises a generally Venturi-shaped tube 360, the lower end of which is connected to the intake manifold, and which is enclosed in a suction chamber 362 connected by a tube 364 with the heater. An inlet 366 for atmospheric air terminates close to the throat of the Venturi-shaped tube 360. Sudden increases in the manifold vacuum will cause corresponding increases in the proportion of air drawn into the tube 360 from the atmosphere, as compared with the volume of gases of combustion which are drawn from the heater. This device is thus effective greatly to reduce the degree of variation in the suction of the heater, although the effect of the device is to reduce the amplitude of fluctuations of vacuum on the heater rather than completely to eliminate such fluctuations.

A further modified form of means for compensating for variations in the degree of vacuum in the intake manifold is illustrated in Fig. 13, which comprises a valve chamber 370, the outlet of which is connected to the intake manifold by a pipe 372. The inlet of the valve chamber 370 is connected to the heater by a pipe 374. Within the valve chamber is a balanced valve member 376 which is adapted partially to cover ports 378. The balanced piston valve 376 is connected to the central portion of a diaphragm 380 by means of a link 382, the diaphragm being suitably mounted in a casing 384. One side of the diaphragm is subjected to atmospheric pressure because of the provision of a vent 386, while the other side of the diaphragm is normally maintained at the same pressure as is present in the pipe 374, through a tube 386 which is provided with a damping restriction 388. The central portion of the diaphragm 380 is normally pressed to the left (Fig. 13) by a light compression coil spring 390, the tension of which may be adjusted by means of a thumb screw 392.

The compensator shown in Fig. 13 operates in the following manner: Upon an increase in the vacuum in the intake manifold, the pressure in the pipe 372 will be decreased, and if the decrease in pressure is sufficiently great and maintained for a sufficient length of time, the pressure within the chamber 384 at the right side of the diaphragm 380 will be decreased and the valve 376 moved to the right against the force of the spring 390, thus partially covering the ports 378, with a resulting decrease in flow of the gases of combustion through these ports and a consequent decrease in the degree of vacuum in the pipe 394. Because of the restriction 388, fluttering of the valve 376 will be prevented, and the compensating correction applied by this valve will be effected gradually.

An additional means for compensating for variations in intake manifold vacuum is illustrated in Fig. 14, and comprises a butterfly valve 396 which is mounted within a pipe 398 connecting the heater with the intake manifold. The stem of the butterfly valve has an arm 400 secured thereto, the free end of the arm being connected by a link 402 to a piston 404 freely reciprocable in a cylinder 406. The cylinder 406 is in communication with the pipe 398 through a relatively small port 408. The piston 404 is normally held in the position in which it is shown in Fig. 14 by a compression coil spring 410, the lower end of which rests upon a swivel spring retainer 412 carried by an adjusting screw 414.

When the intake manifold vacuum is of a normal value, the spring 410 will offer sufficient resistance to downward movement of the piston 404 to hold the butterfly valve 396 in its open position as shown. When, however, the intake manifold vacuum becomes excessive, the decrease in pressure will be transmitted through the port 408 to the cylinder 406 beneath the piston 404, and the atmospheric pressure upon the top of the piston 404 will force the piston downwardly against the force of the spring 410, thus partially closing the butterfly valve 396. Partial closure of this valve will of course result in decreasing the rate of flow of the gases of combustion from the heater, thereby compensating for such changes in intake manifold vacuum. The port 408 is made sufficiently small that the opening and closing of the butterfly valve 396 will be relatively gradual.

In Fig. 15 a further type of compensator for variations in intake manifold vacuum is illustrated, comprising a cylinder 416, the upper portion of which is connected to the intake manifold by a pipe 418. The upper end of the cylinder is connected by a pipe 420 with the heater. Within the cylinder is a sliding valve 422 having a guide 424 integral therewith. The valve is normally pressed downwardly by a compression coil spring 426, its downward motion being limited by a stop pin 428. The lower end of the cylinder is vented to the atmosphere through a restricted port 430.

When the intake manifold vacuum increases greatly beyond normal, the valve 422 will be raised by atmospheric pressure acting upon its lower surface (or upon the lower surface of the guide 424 if the latter has a sufficiently close fit in the cylinder), thus partially cutting off the port leading to the pipe 418, with resulting decrease in the vacuum effective upon the heater. The port 430 serves as a dashpot damper to prevent rapid fluttering and fluctuations of the valve.

In Fig. 16 I have illustrated a further method of compensating for variations in intake manifold vacuum, in which the pipe 432 by which the exhaust gases from the heater are discharged, has a pair of branches 434 and 436. The upper branch 434 is connected to the intake manifold 438 above the throttle valve 440. The throttle valve is the usual butterfly valve by which the speed of the engine is controlled. The upper pipe is provided with a suitable restriction 442, in a measure to restrict the flow of the gases of combustion from the heater to the intake manifold, whereas the lower branch pipe 436 is not provided with this restriction but extends into the throat portion of a Venturi-shaped restriction 444 formed in the bore 446 connecting the engine carburetor with the intake manifold. The Venturi-shaped passageway 444 may constitute a portion of the engine carburetor. The end of the pipe 436 is provided with a check valve 448 which opens outwardly.

It is a well-known fact that the degree of vacuum in the intake manifold changes inversely with the degree of throttle opening of the throttle valve, that is, when the throttle valve is closed or near closed, the vacuum in the intake manifold will be high, and when the throttle valve is wide open, the vacuum will be low. However, the vacuum at the throat of the Venturi-shaped passageway 444 will tend to increase directly upon opening the throttle valve, and will of course be low when the throttle valve is closed or partially closed. In the compensator shown in Fig. 16, these facts are utilized to secure a substantially constant vacuum upon the heater. When the throttle valve is closed or partially closed, the gases of combustion from the heater will be drawn through the upper pipe 434, whereas when the throttle valve is wide open, the gases of combustion will be drawn from the heater through the lower pipe 436, the check valve 448 opening under the latter conditions. The size of the restriction 442 may be computed or experimentally determined so that a substantially uniform vacuum may be maintained upon the heater.

The modified forms of the invention shown in

Figures 13, 14 and 15 are disclosed and claimed in my copending applications Serial Nos. 200,311, 200,312 and 200,313, respectively filed on April 6, 1938, said applications being continuations in part of this application.

The novel subject matter relating to the combustion chamber, the reigniter plug, and associated parts not including the means for compensating for variations in intake manifold vacuum, is claimed in my copending divisional application Serial No. 312,445, filed January 5, 1940.

It will be understood by those skilled in the art that other various modifications and changes may be made in the heater disclosed herein without departing from the basic principles of my invention. I therefore desire to include within the scope of the accompanying claims all such modified forms by which substantially the results of my invention are obtained in substantially the same way.

What I claim and desire to secure by Letters Patent is:

1. In an automotive vehicle having a passenger compartment and an engine compartment, an internal combustion engine in said engine compartment and having an intake manifold in which a partial vacuum exists while the engine is running, and a liquid fuel supply for said engine, an internal combustion heater for said passenger compartment, said heater comprising a heat radiator located within said passenger compartment and having a passageway extending therethrough, a motor driven fan for circulating air in the passenger compartment downwardly past said radiator, a carburetor connected to receive fuel from said supply, a combustion chamber connected to receive a mixture of said fuel and air from said carburetor, means for conducting the gases of combustion from said combustion chamber to said radiator, a conduit connecting said radiator with the intake manifold of the engine, a valve for controlling the flow of gas through said conduit, and means in said conduit for compensating for variations in the degree of vacuum present in said intake manifold, whereby the volume of gas drawn through said carburetor, said combustion chamber and said radiator will be substantially constant irrespective of wide variations in the degree of vacuum in the intake manifold.

2. In an internal combustion heater for automobiles, the combination of a body having a combustion chamber formed therein, a heat radiator secured to said body and having a passageway for receiving the products of combustion from said combustion chamber, and having a duct in said body connected to receive the gases of combustion from said passageway, a valve in said duct, means for connecting said duct to the intake manifold of the engine, and a nozzle located in said duct and forming a restriction therein to compensate for variations in the vacuum present in the intake manifold, whereby the degree of partial vacuum existing in said combustion chamber will be substantially uniform.

3. In a heater for an automotive vehicle having an internal combustion engine provided with an intake manifold, the combination of a fuel and air mixing device, a combustion chamber supplied with a combustible mixture by said device, a radiator connected to receive the heated gases of combustion from said combustion chamber, means for forcing air past said radiator, a conduit connecting the outlet of said radiator to the intake manifold of the engine, and a restriction in said conduit for minimizing the effects upon said mixing device of variations in the suction in the intake manifold.

4. In an automobile heater of the internal combustion type in which the draft for combustion is obtained by the discharge of the products of combustion into a receiver of varying subatmospheric pressure, means for compensating for variations in the subatmospheric pressure of said receiver comprising a tube having a Venturi-shaped passageway extending therethrough, and means for conveying the products of combustion from said heater through said passageway.

5. An automobile heater of the internal combustion type, comprising a combustion chamber, means for supplying said combustion chamber with a combustible mixture of liquid fuel and air, a heat radiator having an inlet port and an outlet port, means for connecting the inlet port to said combustion chamber, a discharge passageway connected to said outlet port, a Venturi-shaped compensator located in said discharge passageway, and means for connecting said discharge passageway to the intake manifold of the automobile engine.

6. In a heater for automobiles, the combination of a combustion chamber, means for supplying a combustible mixture of air and liquid fuel to said combustion chamber, and means for drawing the combustible mixture into and through said combustion chamber, said means comprising a conduit having one end connected to the intake manifold of the automobile engine, a discharge passageway connected to the other end of said conduit, and means for compensating for variations in the intake manifold vacuum, said means comprising a Venturi-shaped nozzle located in said passageway and having a conformation such that substantially the minimum pressure at its throat will be obtained when the intake manifold vacuum is in the order of three or four inches of mercury.

7. In an automobile heater of the internal combustion type in which the draft for combustion is obtained by the discharge of the products of combustion into a receiver of varying subatmospheric pressure, means for compensating for variations in the subatmospheric pressure of said receiver comprising a restricted passageway, and means for conducting the products of combustion from said heater through said passageway.

8. An automobile heater of the internal combustion type, comprising a combustion chamber, means for supplying said combustion chamber with a combustible mixture of liquid fuel and air, a heat radiator having an inlet port and an outlet port, means for connecting the inlet port to said combustion chamber, a discharge passageway connected to said outlet port, means for connecting said discharge passageway to the intake manifold of the automobile engine, and means for compensating for variations in the vacuum in the intake manifold whereby a substantially uniform partial vacuum will be present in said combustion chamber.

9. In an automobile heater, the combination of a combustion chamber, means for supplying a combustible mixture of air and liquid fuel to said combustion chamber, and means for drawing the combustible mixture into and through said combustion chamber, said means comprising a conduit having one end connected to the intake manifold of the automobile engine, a discharge passageway connected to the other end of said conduit, and means for compensating for variations in the intake manifold vacuum, said compensating means comprising a nozzle located in said passageway and having a restricted opening such that substantially the minimum pressure at said restriction will be obtained when the intake manifold vacuum is in the order of three or four inches of mercury.

10. In a heater for automotive vehicles having internal combustion engines controlled by throttle valves, the combination of a combustion chamber, means for supplying a combustible mixture of air and liquid fuel to said combustion chamber, and means for drawing the combustible mixture into and through said combustion chamber, said means comprising a branched conduit having a pair of branches, one connected to the throttle valve bore of the automobile engine at the intake manifold side of the throttle valve and the other connected to said bore at the carburetor side of the throttle valve, a discharge passageway connected to the other ends of said branches, a restriction in the first of said branches, and an outwardly opening check valve in the other of said branches, whereby the gases of combustion will be drawn from said combustion chamber mainly through the branch which is subjected to the greatest vacuum.

11. In an automotive vehicle having a passenger compartment and an engine compartment, an internal combustion engine in said engine compartment and having an intake manifold in which a partial vacuum exists while the engine is running, and a liquid fuel supply, an internal combustion heater for said passenger compartment, said heater comprising a heat radiator having a passageway extending therethrough, a motor driven fan for circulating air from the passenger compartment past said radiator, a carbureting device connected to receive fuel from said supply, a combustion chamber connected to receive a mixture of said fuel and air from said carburetor, means for conducting the gases of combustion from said combustion chamber to said radiator, a conduit connecting said radiator with the intake manifold of the engine, a valve for controlling the flow of said mixture and gases through said carbureting device and said radiator, and restriction means in said conduit for compensating for variations in the degree of vacuum present in said intake manifold, whereby the volume of gas drawn through said carburetor, said combustion chamber, and said radiator will be substantially constant irrespective of wide variations in the degree of vacuum in the intake manifold.

12. In an automobile heater of the internal combustion type in which the draft for combustion is obtained by the discharge of the products of combustion into a receiver of varying subatmospheric pressure, a combustion chamber, a heat exchange device connected to said combustion chamber, a conduit connecting said heat exchanger to the receiver, means for compensating for variations in the subatmospheric pressure of said receiver comprising a restriction having a passageway extending therethrough, said passageway being of such form and dimensions that the pressure in at least a part of the passageway will closely approach absolute zero pressure when the degree of vacuum in said receiver is in the order of four inches of mercury.

13. In an automobile heater of the internal combustion type in which the draft for combustion is obtained by the discharge of the products of combustion into a receiver of varying subatmospheric pressure, means for compensating for variations in the subatmospheric pressure of said receiver comprising a conduit element having a restricted passageway, means for conducting the products of combustion from said heater to said receiver through said passageway, a second conduit for conducting products of combustion from said heater to said receiver, and a check valve in said second passageway.

14. In a heater for an automotive vehicle driven by an internal combustion engine controlled by a throttle valve, the combination of a combustion chamber, means for supplying a combustible mixture of air and liquid fuel to said combustion chamber, and means for drawing the combustible mixture into and through said combustion chamber, said means comprising a branched conduit having a pair of branches, one connected to the throttle valve bore of the automobile engine at the intake manifold side of the throttle valve and the other connected to said bore at the carburetor side of the throttle valve, a discharge passageway connecting the other ends of said branches to said combustion chamber, the first of said branches having a flow controlling restriction therein, and an outwardly opening check valve in the other of said branches, whereby the gases of combustion will be drawn from said combustion chamber mainly through the branch which is subjected to the greatest vacuum.

15. In a device associated with an internal combustion engine having an intake manifold, and depending upon a difference between the atmospheric pressure and the intake manifold vacuum for its operation, means for compensating for variations in the intake manifold vacuum, said means comprising an element having a Venturi-shaped passageway therethrough in the path of flow of fluid from the atmosphere through said device and into the intake manifold.

16. In a device associated with an internal combustion engine having an intake manifold and depending upon the intake manifold vacuum for its operation, means for drawing a fluid into and through said device, said means comprising a conduit having one end connected to the intake manifold and the other end connected to the device, and means for compensating for variations in the degree of vacuum in said manifold, said means comprising an element located in said conduit and having a passageway of conformation such that substantially the maximum flow rate will be obtained when the intake manifold vacuum is in the order of three or four inches of mercury.

HENRY J. De N. McCOLLUM.